Jan. 22, 1946. E. G. SCHEUPLEIN 2,393,420
COOKING VESSEL
Filed May 27, 1944 2 Sheets-Sheet 1

INVENTOR
Ernest G. Scheuplein
BY
Clark & Ott
ATTORNEYS

Jan. 22, 1946.   E. G. SCHEUPLEIN   2,393,420
COOKING VESSEL
Filed May 27, 1944   2 Sheets-Sheet 2

INVENTOR
Ernest G. Scheuplein
BY Clark & Ott
ATTORNEYS

Patented Jan. 22, 1946

2,393,420

UNITED STATES PATENT OFFICE 2,393,420

COOKING VESSEL

Ernest G. Scheuplein, Princeton, N. J.

Application May 27, 1944, Serial No. 537,597

2 Claims. (Cl. 99—403)

This invention relates to cooking utensils and refers more particularly to cooking vessels such as are employed in hotel and restaurant kitchens for cooking of large quantities of vegetables or other food.

At the present time when cooking large quantities of vegetables or other foods which are boiled and then subjected to a cold water rinse and drained, chefs are handicapped by the lack of proper equipment to insure a thorough and uniform cooking thereof and a safe and proper rinsing and draining of the food after the cooking operation is completed.

It is therefore the main purpose of the present invention to overcome the above noted objections and disadvantages by providing effective means in the nature of an accessory or attachment for cooking vessels of the indicated character which functions to maintain the entire batch completely submerged in the water or liquid so as to insure proper and uniform cooking thereof without the necessity of stirring or agitating the same; which accessory or attachment permits of a rapid and thorough cold water rinsing of the batch without loss or waste of the cooked food while facilitating the thorough and effective draining of the water or liquid from the food without danger of scalding or other injury to the chef or the inconvenience of having to hold the vessel and a separate draining implement as is now the practice.

The invention further comprehends an accessory or attachment for cooking vessels which is so constructed and arranged as to confine the articles being cooked between superposed members located between the top and bottom of the vessel to prevent accidental burning of the food or damage to the vessel.

The invention further resides in the provision of a cooking vessel and an accessory therefore which is comparatively simple in its construction and mode of use and which may be economically produced and sold at a relatively low price.

With the above enumerated and other objects in view, the invention is set forth in greater detail in the following specification, particularly pointed out in the appended claims and illustrated in the accompanying drawings, in which:

Figure 1:
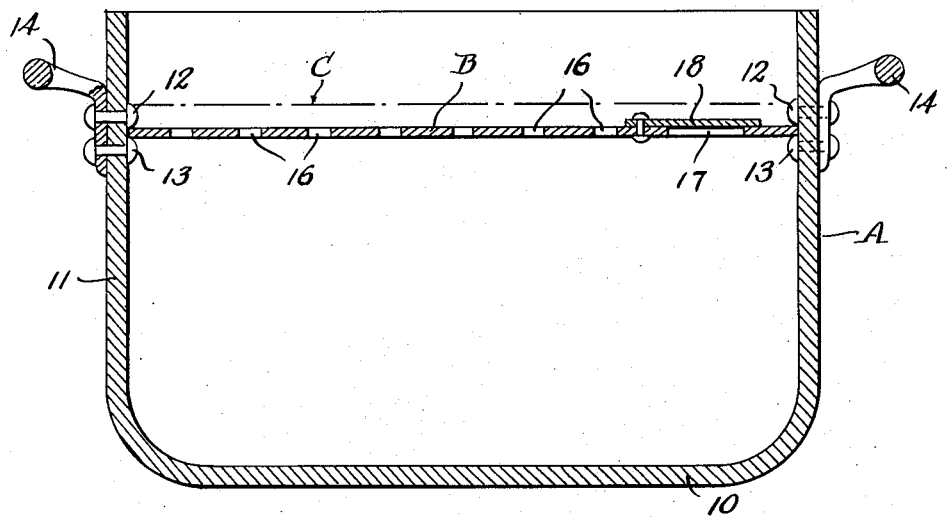
Fig. 1 is a vertical sectional view through a cooking vessel and an accessory therefor constructed in accordance with the present invention.
Figure 2:
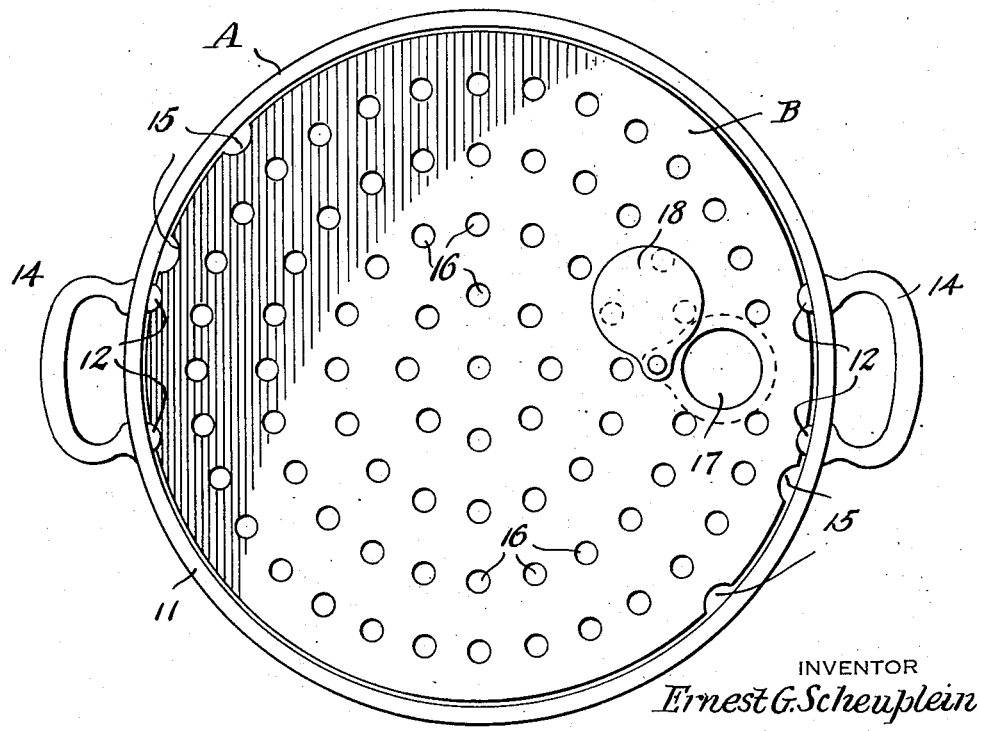
Fig. 2 is a top plan view thereof.

Referring to the drawings by characters of reference and particularly to the form of the invention disclosed in Figs. 1 and 2, A designates a cooking vessel or kettle open at the top and including a circular bottom wall 10 and an upstanding cylindrical wall 11. Two or more vertically spaced upper and lower lugs 12 and 13 project inwardly from the inner surface or periphery of the wall 11 of the vessel and four upper lugs and four lower lugs are shown arranged in circumferentially spaced relation, the same being arranged in pairs at substantially diametric opposite positions. As many cooking vessels of this type are now provided with looped handles 14 which are riveted thereto, the inwardly projecting rivet heads may serve as the lugs 12 and 13 as shown in Figs. 1 and 2.

One or more members or disks B are provided which are of circular formation and of a diameter to fit within the vessel A with just sufficient clearance between the outer periphery thereof and the inner periphery of the wall 11 to permit of emplacement and removal of the members B. Each member or disk A is provided with circumferentially spaced peripheral notches 15 corresponding in number and arrangement to the lugs 12 and 13 so that member A may be inserted to a position where it is disposed between the upper and lower lugs and then turned to locate the notches 15 out of registry with the lugs. This serves to support and retain the member in a fixed position between the lugs against either upward or downward relative movement with reference to the vessel A.

The members or disks A are provided with perforations 16 distributed over the entire area thereof and the disk being used will have the perforations of an appropriate size and properly spaced for the particular vegetable or food being cooked, it being apparent that in every instance the size of said openings will necessarily be smaller than the articles of food being cooked.

In practice, for the larger vegetables such as potatoes, beets, turnips, carrots, onions, corn on the cob and etc., the perforations should be approximately three-quarters of an inch in diameter spaced apart about an inch and one-half, while smaller vegetables such as peas, cut corn, lima beans and the like will require perforations approximately one-eighth of an inch in diameter spaced apart approximately one-quarter of an inch. In some cases such as when cooking rice, barley and the like, the perforations should be still smaller and spaced closer together. In any event it will be understood that within the scope of the invention, they may be of any appropriate size or shape and properly spaced so as to prevent the passage therethrough of the articles being cooked or drained.

In order to facilitate the manipulation of the members or disks B when emplacing the same within or removing the same from the vessel A, said members are each formed with a relatively large opening 17 of a size to freely receive the finger or thumb. The opening 17 also serves as a means through which the nozzle or outlet end of a hose may be inserted for effecting a cold water rinsing of the cooked food which is a common practice resorted to for preventing discoloration of the food if left standing for any considerable length of time. A displaceable cover 18 for the opening 17 is provided such as the small disk-like plate shown, which is preferably pivotally attached to the member B for swinging to and from closed relation with the opening 17.

In use and operation, the vegetables or other articles of food to be cooked are placed in the vessel A and covered with water. The member or disk B is then inserted in the vessel and locked in place between the upper and lower lugs 12 and 13. This is readily accomplished by registering the notches with the upper lugs 12 and lowering the member until it passes beyond said lugs. The member is then turned to dispose the notches 14 out of registry with the lugs so that the same rests upon the lower lugs 13 and is retained against movement toward the top of the vessel by the upper lugs 12 which overlie the same. In order that the articles may be properly and uniformly cooked, the level of the water as indicated by the broken line C should be above the member B. This insures all of the articles being submerged thus avoiding the necessity of frequently stirring the same which is required where some of the articles float on the top and no means is provided for keeping them submerged.

After the cooking operation is completed, it is the usual practice to first drain the hot water from the cooked articles which heretofore has been accomplished by holding a strainer over the vessel with one hand and inverting the same with the other, which is difficult and dangerous when handling a large heavy vessel and frequently results in scalding of the chef and spillage, loss and waste of the food which falls onto the floor or into the sink. After draining in this manner, the vessel with its contents is then placed in a sink and cold water is run over the same to rinse and preserve the color of the cooked food. This has been found unsatisfactory as in many cases the food flows over the top of the vessel and is wasted or lost in the sink and drains.

In contradistinction to this, by utilizing the member or disk B, the operation is greatly facilitated and rendered much safer as immediately following the completion of the cooking operation, the vessel is inverted in the sink, the perforated member B then acting as a strainer through which the water passes while retaining the cooked food in the vessel. The vessel is then turned right side up, the cover 18 displaced from the opening 17, the end or nozzle of a hose inserted in the opening and the cold water rinsing accomplished while the member B traps the food therein and prevents flowing of the same from the vessel during the rinsing operation. After rinsing, the vessel A is again inverted for draining the cold water therefrom and it is then turned right side up and the member or disk B removed.

Figure 3:
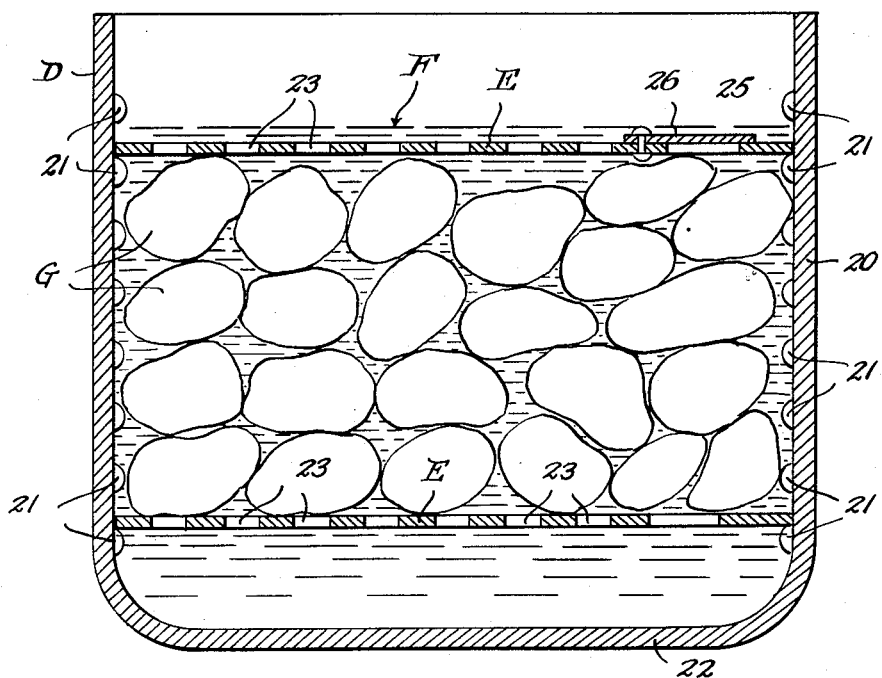
Fig. 3 is a vertical sectional view through a cooking vessel and an accessory therefor constructed in accordance with a modification of the invention.
Figure 4:
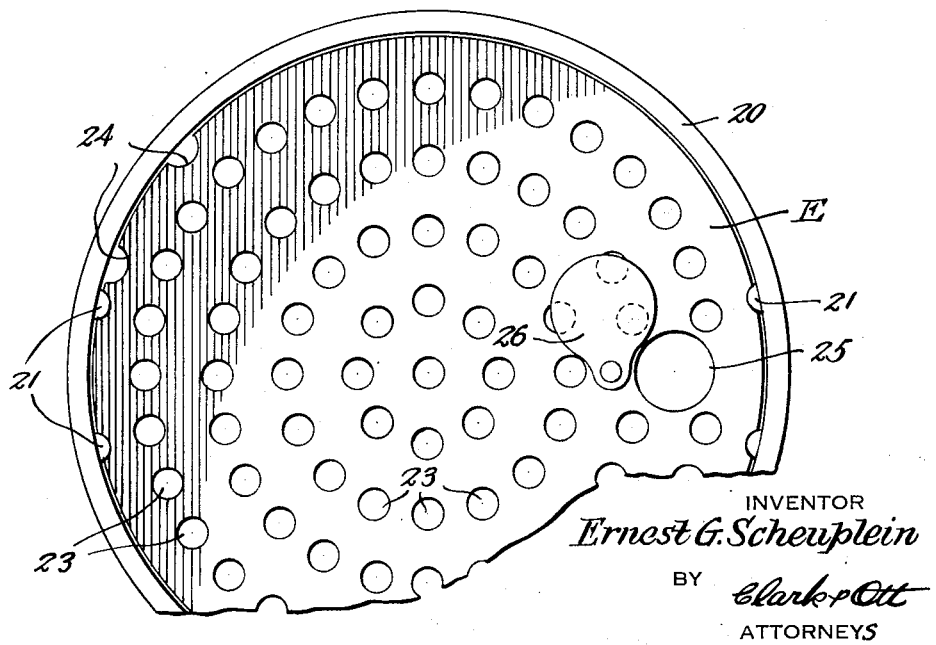
Fig. 4 is a fragmentary top plan view thereof.

In the modification shown in Figs. 3 and 4 of the drawings, the vessel D is formed with inwardly projecting vertically spaced lugs 21 on the inner surface of its upstanding wall 20, said lugs being arranged in two pairs of rows located diametrically opposite. In this instance two of the perforated members or disks E are employed arranged within the vessel in vertically spaced relation, each member being located between adjacent vertically spaced pairs of lugs 21. In practice, one of the disks is located adjacent the bottom 22 of the vessel B with the other being located adjacent the top of the vessel below the water level F and with the articles G to be cooked located between said members. As in the previous form, the members or disks E are formed with perforations 23 and peripheral notches 24 to pass over the lugs when emplacing and removing the disks. The upper disk E is formed with a thumb or finger hold receiver opening 25 which also serves as a means for the introduction of a hose terminal or nozzle for rinsing and a closure disk 26 is pivoted adjacent thereto for covering the opening when not in use.

What is claimed is:

1. In a cooking vessel, a hollow body open at the top, a plurality of circumferentially disposed vertically spaced upper and lower lugs projecting inwardly from the inner face of the upstanding wall of said body, and a disk-like member having perforations of lesser size than the articles to be cooked and formed with peripheral notches corresponding in their circumferential arrangement to the arrangement of the lugs and adapted to pass over the upper lugs for fitting said member within the vessel body between the upper and lower lugs to removably retain said member in associated relation with the vessel below the liquid level and above the articles to be cooked therein, said member having an opening constituting means for facilitating manipulation thereof to emplace and remove the same and which opening also serves as a means for inserting a hose to rinse the cooked articles, and a displaceable cover for said opening to prevent the escape of the cooked articles during the cooking and rinsing operations and when the vessel is inverted for draining.

2. In a cooking vessel, a hollow body open at the top, a plurality of circumferentially spaced rows of lugs projecting inwardly from the inner periphery of the upstanding wall of the body, a pair of disk-like members each having perforations of lesser size than the articles to be cooked and formed with peripheral notches corresponding in their circumferential arrangement to the arrangement of the lugs and adapted to be passed over the rows of lugs for fitting said members within the vessel body between adjacent pairs of vertically spaced lugs to removably retain said members in associated relation with the vessel with said members spaced apart vertically to receive therebetween the articles to be cooked and with the uppermost member below the liquid level and said uppermost member having an opening constituting means for facilitating manipulation thereof to emplace and remove the same and which opening also serves as a means for inserting a hose to rinse the cooked articles, and a cover pivoted to said uppermost member for movement to and from overlying relation with said opening to prevent the escape of the cooked articles during the cooking and rinsing operation and when the vessel is inverted for drainage.

ERNEST G. SCHEUPLEIN.